United States Patent [19]

Gallmeyer

[11] 4,291,911
[45] Sep. 29, 1981

[54] AIR DAM APPARATUS FOR A MOTOR VEHICLE

[76] Inventor: William W. Gallmeyer, 513 Krause St., Ann Arbor, Mich. 48103

[21] Appl. No.: 119,168

[22] Filed: Feb. 6, 1980

[51] Int. Cl.³ .......................................... B62D 37/00
[52] U.S. Cl. ................................... 296/78 R; 296/91; 296/1 S; 280/770
[58] Field of Search .............. 296/1 S, 1 R, 91, 78 R; 280/770, 153 A, 762; 293/38-40

[56] References Cited

U.S. PATENT DOCUMENTS

| | | | |
|---|---|---|---|
| 3,618,998 | 11/1971 | Swauger | 280/762 X |
| 3,815,700 | 6/1974 | Mittendorf | 296/1 S X |
| 3,869,166 | 3/1975 | Burst et al. | 296/1 S X |
| 4,119,339 | 10/1978 | Heimberger | 296/1 S |
| 4,131,308 | 12/1978 | Holka et al. | 296/1 S |
| 4,131,309 | 12/1978 | Henke | 296/1 S |
| 4,159,140 | 6/1979 | Chabot et al. | 296/1 S |
| 4,159,845 | 7/1979 | Bratsberg | 296/1 S X |

FOREIGN PATENT DOCUMENTS 324954 10/1957 Sweden .................................. 296/91

*Primary Examiner*—Joseph F. Peters, Jr.
*Assistant Examiner*—Norman L. Stack, Jr.
*Attorney, Agent, or Firm*—Kalish & Gilster

[57] ABSTRACT

Air dam apparatus for a motor vehicle includes a so-called door for deflecting air from the frontal clearance area at the front of the vehicle and below its structure such as the front bumper. The apparatus includes securement struts adapted for being attached to the vehicle structure for extending below it at the front of the vehicle. Fitments provide pivotal attachment of the door to the struts with the door extending transversely across and below the front of the vehicle and positioned centrally at the front of the vehicle for deflecting air which otherwise would pass between the vehicle wheels and beneath the vehicle itself to produce aerodynamic drag causing reduced fuel efficiency. The pivotal attachment permits rocking of the door about a transverse pivot axis for exposure of the door to aerodynamic forces. The pivot axis is located vertically with respect to the door so that such aerodynamic forces are balanced above and below the pivot axis. Torsion bars which define the pivot axis serve to resiliently urge the door toward an air damming or blocking position about the pivot axis, the door being rockable on the pivot axis from the air blocking position in response to obstructions which may contact the door below the pivot axis.

12 Claims, 9 Drawing Figures

AIR DAM APPARATUS FOR A MOTOR VEHICLE

BACKGROUND AND SUMMARY OF THE INVENTION

This invention relates to aerodynamic deflection of air from the front of a vehicle and more particularly to an air dam apparatus for deflecting air from the front of a truck to prevent air from passing therebeneath, thus conducing to vehicle fuel savings.

The use of air deflectors for vehicles was proposed at least as long ago as 1936 in Backus U.S. Pat. No. 2,036,560 disclosing the use of an inverted airfoil at the front of a vehicle for streamlining purposes. Since then, there has been increasing usage of airfoils and so-called "wings" (so termed because of the airfoil configurations used), as well as spoilers at the front and rear of vehicles. Such devices have been used for two alternative purposes, primarily. These are increasing the "weight" or downforce of a vehicle upon its wheels for improving handling or traction; and decreasing aerodynamic drag.

Typical of the prior art concerned with the first purpose are Burst et al U.S. Pat. No. 3,869,166, disclosing a bulge-like, dipped extension around the front of an automobile at its lower margin; Swauger U.S. Pat. No. 3,618,998; and Holka et al U.S. Pat. No. 4,131,308. The latter two patents disclose so-called chin spoilers for vehicles, mounted to increasingly block or deflect air as air pressure in the spoiler increased with vehicle speed.

Typical of the prior art concerned with the second purpose is Heimburger U.S. Pat. No. 4,119,339. The latter discloses the use of a rectangular panel mounted by hinges at the lower edge of carryall-type vehicles and with a gear driven linkage mechanism for selectively raising or lowering the panel by swinging about the hinges.

The present invention is particularly concerned with the equippage of trucks, especially truck tractors of the type for hauling trailers at highway speeds, with an air deflector for reducing aerodynamic drag.

Such trucks, or truck tractors, and particularly the cab-over-engine (COE) design typically are blunt and large, having been developed to meet various laws and regulations and to provide maximum carrying capability but without concern for aerodynamics. The amount of air resistance, and consequent fuel economy, of such vehicles is dependent not only with the frontal area of the vehicle but also upon other factors including shape, surface texture, and various protrusions, apertures and other structure having high form drag or producing parasitic drag.

To improve aerodynamics of trucks and particularly COE tractors, wind deflectors have been used atop the cab roof whereby air will more smoothly flow up over the cab and any box-shaped trailer pulled by the tractor, said trailer often projecting well above the roofline of the tractor.

Although widespread usage of cab roof deflectors has been made, there can be disadvantages. Thus, where a tractor is used to pull a flatbed or tanker trailer, or is not pulling a trailer, the extra vertical protrusion of the deflector is counterproductive, adding only additional frontal area and consequently more form drag and thus causing poorer mileage than ordinarily. Thus, only tractors pulling high trailers can be advantageously equipped with a cab roof deflector.

It is believed that fuel savings estimated to be 5% can be obtained when such a cab roof deflector is used upon a tractor pulling such a high trailer. But, because of the high drag and general aerodynamic interference of air which is permitted to pass below the front bumper between the vehicle lower edge and ground level, and thus into what is herein termed a frontal clearance area of the vehicle, significant opportunity for fuel savings is lost. It is believed that fuel savings of about 3% may be obtained by deflecting air from such frontal clearance area in accordance with the invention regardless of what type of trailer, if any, the tractor is pulling. Accordingly, the accumulated total savings from apparatus of the invention can well exceed that obtained when using instead a cab roof deflector, considering the various types of trailer loads which a tractor may pull, as well as accessories when no trailer is being pulled.

However, a problem associated with "chin spoilers," airfoils and other devices proposed heretofore for deflecting air from the frontal clearance area of a vehicle is that the lower edge of the deflection apparatus has been required to be spaced well above ground level to allow for objects upon the ground, snow, ruts and other obstructions. Such spacing above ground allows air to pass beneath the deflector with consequent inefficiency. Proposals have been made, as in each of the above-identified Swauger, Holka et al and Heimburger patents to have the deflector swing down under highway travel conditions. But even when so deployed, the deflectors allow air to pass therebeneath, or are substantially unyielding to obstacles, or do not deflect air from the full width of the vehicle.

It is an object of the invention to provide an improved air dam apparatus for deflecting air from a frontal clearance area of a vehicle.

It is a further object of the invention to provide such an air dam apparatus particularly well-suited for use on trucks and truck tractors, etc., such is, for example, of the COE type.

It is a still further object of the invention to provide such an air dam apparatus which extends not only substantially down to ground level, but also across substantially the entire width of the vehicle, including in front of the tires.

It is another object of the invention to provide such an air dam apparatus which yields to road obstructions or hazards, such as objects, ruts, snow, etc. to prevent damage to the deflector yet returns to an air deflecting position after so yielding.

Among still other objects of the invention are the provision of such an air dam apparatus which is highly aerodynamically efficient; which is easily and quickly installed upon vehicles; which is of economical, long-lasting and simple construction, having a minimum of parts and components; and which provides an attractive appearance as a result of excellence of industrial design.

Various other objects and features will be in part apparent and in part pointed out hereinbelow.

BRIEF DESCRIPTION OF THE DRAWINGS

Corresponding reference characters indicate corresponding elements throughout the views of the drawings.

DESCRIPTION OF THE PREFERRED EMBODIMENT

Figure 1:
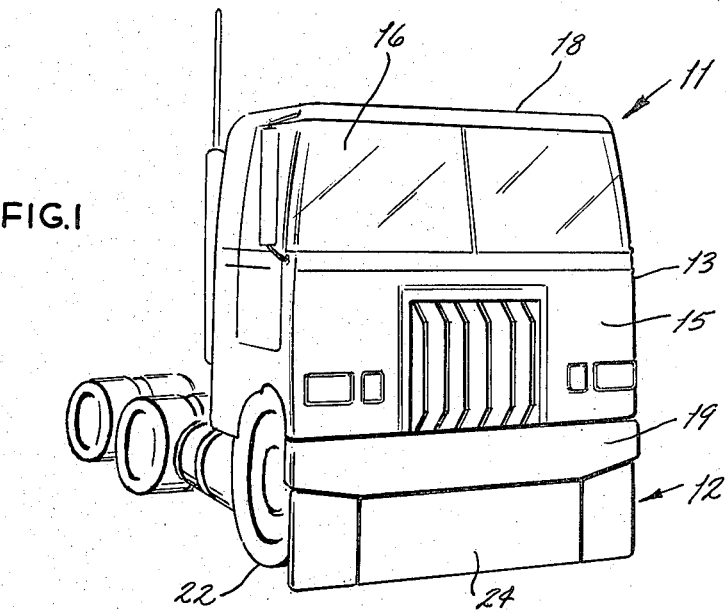
FIG. 1 is a frontal perspective view of a truck tractor equipped with an air dam apparatus constructed in accordance with and embodying the present invention.
Figure 2:
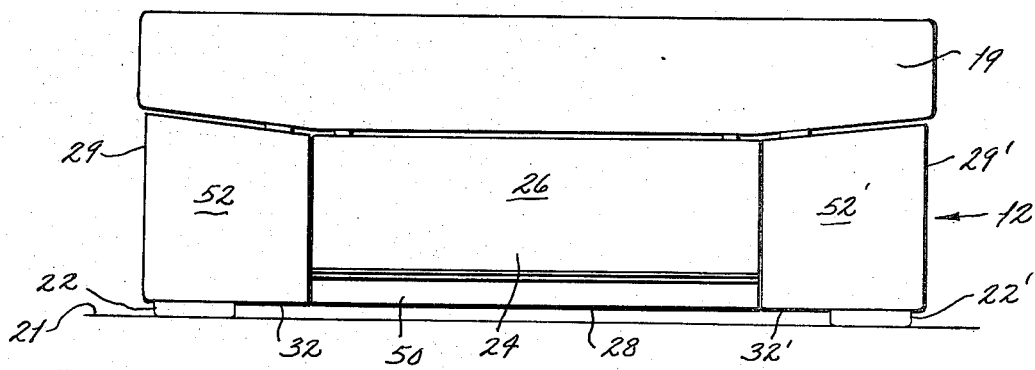
FIG. 2 is a front elevation of the air dam apparatus and front bumper of the tractor.
Figure 3:
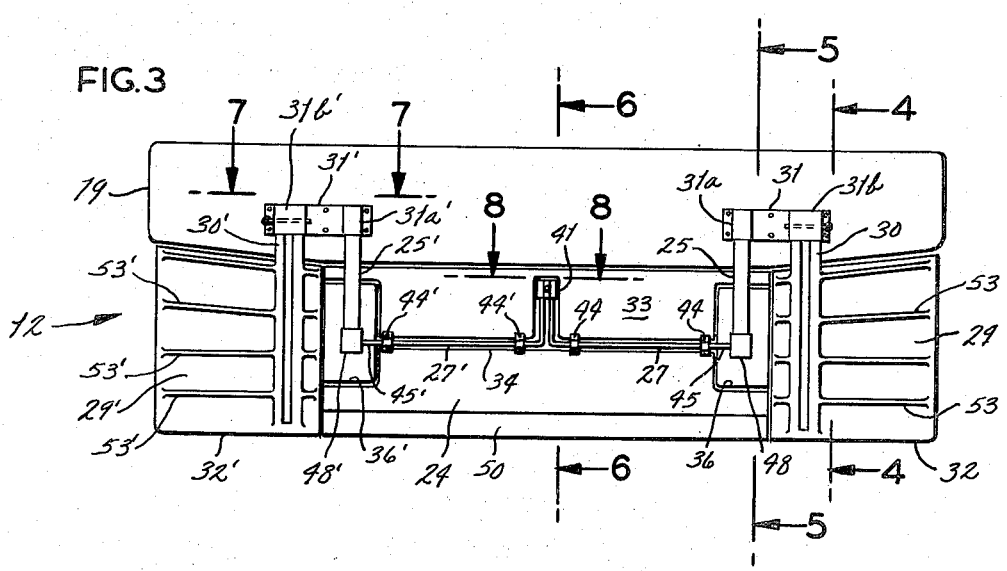
FIG. 3 is a rear elevation of the air dam apparatus and front bumper, illustrating attachment of the apparatus thereto.
Figure 5:
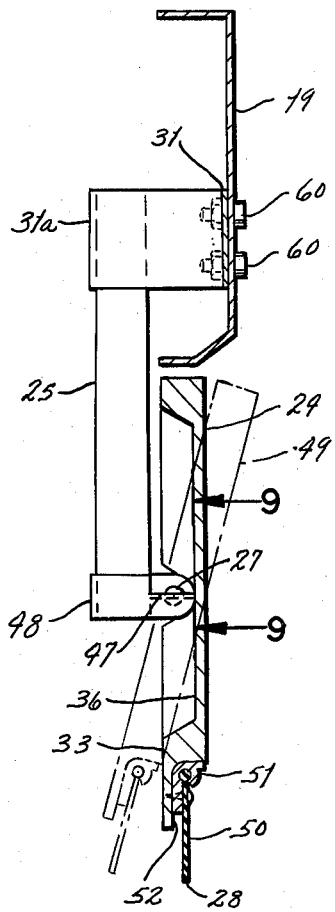
FIG. 5 is an enlarged cross-section of a deflector panel of the apparatus and bumper, illustrating a pivotal mounting or securement of the panel, and taken along line 5—5 of FIG. 3.
Figure 6:
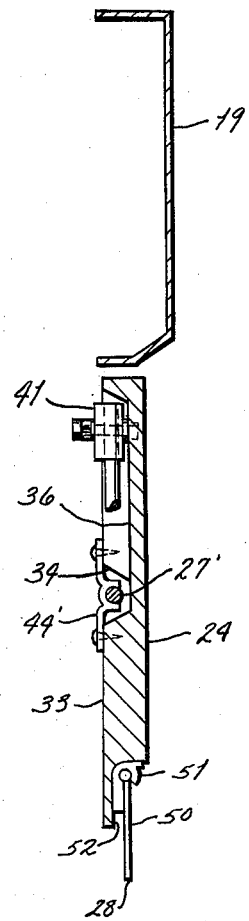
FIG. 6 is an enlarged cross-section of the deflector panel and bumper, taken along line 6—6 of FIG. 3, and illustrating a certain torsion bar feature of the apparatus.

Referring now to the drawings, illustrated generally at 11 is a truck tractor of the cab-over-engine (COE) type to which is shown equipped with the new air dam apparatus, designated generally at 12. Tractor 11 includes a squarish, typically massive cab 13 having a more or less flat, continuous frontal surface 15 extending upward to a windshield 16 and thence to an approximately flat cab roof 18 and downward to a large bumper 19, the lower edge of which is typically spaced well above ground level. Thus, the tractor provides a large frontal surface area.

Bumper 19 extends at least the approximate width of the tractor so as to provide a frontal clearance area which, in the absence of apparatus 12, would be open to the movement of air, or relative wind, as the truck moves over a highway, or other ground level surface 21. Such air normally would strike the front wheels 22,22' and various parts of the chassis and undercarriage, including various frame, axle and structural members and other usual components (not shown) of the tractor. The air passing under the truck through the frontal clearance area also normally would pass across various apertures and other aerodynamically disturbing structure. Thus, high form and parasitic drag is produced by the air passing under the vehicles, requiring additional horsepower to maintain a given speed and conducing to loss of efficiency and wasted use of fuel to generate the horsepower needed to overcome such drag.

Briefly, apparatus 12 comprises an air deflection doorlike panel member 24, referred to herein as a door, which is dimensioned for substantially blocking the frontal clearance area by deflection of air therefrom upon forward movement of tractor 11. Struts 25,25' are adapted for being attached to bumper 19 or other structure of the tractor for extending therebelow at the front of the tractor. A pivot means defined by a pivotal mounting of torsion bars 27,27' hingedly secures door 24 to the respective struts 25,25' with the panel extending transversely across the frontal clearance area, presenting a flat front face 26 and permitting the lower edge 28 to be closely proximate ground level, i.e., surface 21, leaving but a scant, thin spacing of a few centimeters to avoid continuous dragging of edge 28 along surface 21, and such scant spacing being essentially neglectible from an aerodynamic viewpoint, as the amount of air permitted to pass under edge being normally of neglectable consequence compared with the amount of air which is normally deflected by door 24.

The pivotal mounting of torsion bars 27,27' defines a transverse pivot axis about which door 24 may rock. The pivot axis is vertically positioned with respect to door 24 so that substantially equal areas of the door above and below the pivot axis are exposed to the relative wind impinging upon the door during forward movement of the vehicle. Thus, as tractor 11 travels over surface 21, there is substantial balancing of aerodynamic forces in door 24 above and below the pivot axis tending to maintain the door in the air blocking, or deflecting, position illustrated. However, torsion bars 27,27' are so mounted to door 24 and to the respective struts 25,25' that they act as means resiliently urging door 24 with respect to the pivot axis toward its blocking position shown, yet permitting rocking about the pivot axis away from the blocking position in response to a road obstruction contacting the door below the pivot axis, and with torsion bars 27,27' then causing the door to be restored to its blocking position.

Positioned on opposite sides of door 24 and thus winging same are additional or auxiliary panel members 29,29' which are referred to herein as wings, although not of airfoil configuration. Wings 29,29' serve to extend the width of apparatus 12 so that a substantially continuous air deflection or air dam surface is provided below and across the entire front of the truck, i.e., its entire width. Securement of the wings to tractor 11 is provided by strut-like upper extensions 30,30' of the respective wings, which extensions are engaged by means of bracket assemblies 31,31' bolted or welded to the rear of bumper 19. Said assemblies 31,31' also secure the door mounting struts 25,25' to bumper 19. The lower edge 32,32' of each wing is substantially aligned with door bottom edge 28; thus serving effectively to extend the latter the full width of the vehicle. Said wings 29,29' are seen to be positioned in front of the respective front wheels 22,22' for blocking air therefrom.

The wings are of a semi-resilient nature but are not pivotally mounted in the manner of door 24. However, as explained below, they are secured in such a way that they can be pulled downwardly away from the brackets 31,31', i.e., will tear away, in the event of any emergency, collision or other occurrence causing extraordinary downward force upon them.

More specifically, door 24 is preferably of rectangular shape and molded as one piece of tough, resilient synthetic resin material such as blow-molded polypropylene, ABS (acrilonitrite-butadiene-styrene terpolymer), polycarbonate, as well as various other polymers and copolymers. However, the door may be of metal, such as aluminum alloy, steel and so forth. When formed of the preferred synthetic resin material, door 24 is formed so that its back face 33 includes a transversely extending narrow channel or recess 34 which opens into two large rectangular recesses 36,36'. Further, a narrow channel or recess 37 extends vertically upward from recess 34.

Torsion bars 27,27' are each of L-shaped configuration. Lying in recess 34 in aligned relationship are the drag portions of each of torsion bars 27,27', the short portions lying parallel and in immediate adjacency in vertical recess 37, wherein the remote ends 39,39' of said short portions are clamped against the surface of recess 37 by a retainer 41 having a corresponding pair of grooves and affixed to door 24 by a bolt 42. The long portions are secured within recess 34 by small retainers 44,44' which permit the respective elongated portions of the torsion bars to rotate within recess 34 upon twisting of the torsion bars. The remote outer ends are 45,45' of each torsion bar.

Figure 7:
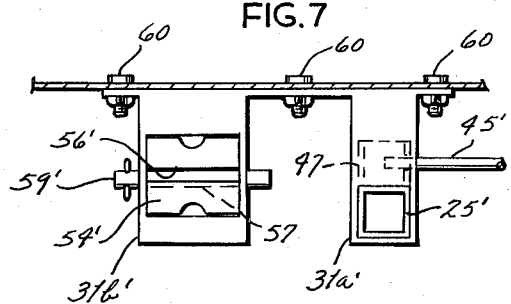
FIG. 7 is a fragmentary top elevation of the bumper and certain securement features of the apparatus, taken generally along line 7—7 of FIG. 3.
Figure 8:
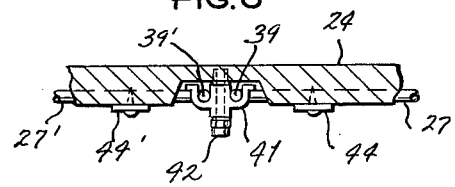
FIG. 8 is a similar fragmentary top elevation of portions of the panel and torsion bar feature taken along line 8—8 of FIG. 3.
Figure 9:
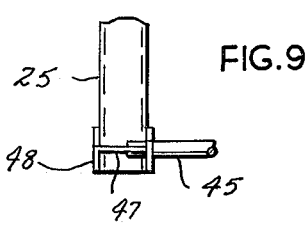
FIG. 9 is a fragmentary top elevation of an end portion of a certain torsion bar and associated fitment of the apparatus, and taken generally along line 9—9 of FIG. 5.

Each torsion bar outer end 45,45' is slotted, as evident in FIGS. 7 and 9, for receiving a blade-like portion 47 of fitments 48,48' carried at the lower end of the strut 25,25'. The struts are seen to be of rectangular configuration as provided preferably by steel tubing welded at the upper end to the respective bracket 31,31' within a respective socket portion 31a,31a' suitably formed by the bracket. Bolts, as indicated at 60, secure the brackets to bumper 19. Recesses 36,36' are thus seen to receive and accomodate the lower ends of the struts and fitments.

Since the horizontal portions of torsion bars 27,27' are free to turn within the retainers 44,44', yet rotation of the outer or remote ends 45,45' of the torsion bars is resisted by the blade-like portion 47 of each of fitments 48,48', the torsion bars are seen to resiliently urge door 24 about a pivot axis defined by the horizontal torsion bar portions toward the air blocking movement upon twisting or rocking force applied to the door, as when an obstruction is struck by it. The position of door 24 as it rocks about its pivot axis upon contacting an obstruction is shown at 49.

As further protection of door 24, there is provided along the length thereof at its lower margin a skirt 50 of rubber or flexibly resilient synthetic material. The skirt is held in place along the lower margin by a metal extension 51 fitted within an L-shaped recess 52 along the lower margin of the door in its front surface.

Wings 29,29' are preferably also, like door 24, each molded as single, integral pieces of rotational-molded polypropylene or another one of the synthetic materials noted hereinabove, being of essentially semi-rigid, somewhat resilient character, so as yieldably to deform without breakage in response to striking an obstacle yet resisting normal aerodynamic forces during vehicle movement. Each wing 29,29' is of approximately rectangular shape, though having the upper edge thereof slightly angled to conform to a slight upward taper of the lower edge of the bumper at its ends. Regardless of the bumper shape, the wings 29,29', like door 24, thus conform to lower edge of the bumper or other edge-defining structure of the vehicle.

Each wing presents a flat frontal air deflection surface 52,52' but having on the rear surface a central reinforcing or stiffening rib forming the respective extension 30,30' by which each wing is secured, and with lateral reinforcing ribs as indicated at 53,53'. Each said extension is received within a corresponding socket-like portion 31b,31b' of each bracket assembly 31,31'.

Figure 4:
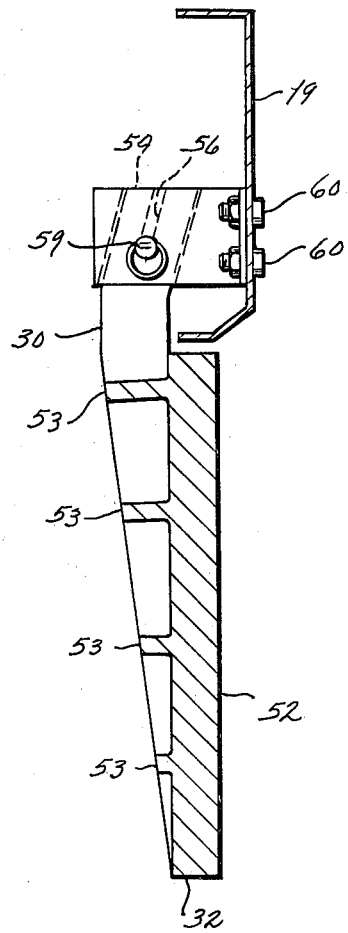
FIG. 4 is an enlarged cross-section of a wing member of the apparatus and bumper taken along line 4—4 of FIG. 3.

Referring to FIGS. 4 and 7, each extension 30,30' includes a forwardly angled portion 54,54' and the section of socket portions 31b,31b' being of corresponding section. Each said portion is provided with a transverse slot 56,56', the bottom of which is of slightly increased thickness, as at 57 (FIG. 7), for receiving a removable pin 59,59' having a diameter slightly greater than the thickness of each slot 56,56' throughout the majority of its depth. Each pin 59,59' can thus be pulled out for removal and/or installation of the respective wing 29,29', as during repairs in the vehicle or for replacement purposes, yet otherwise each wing is reliably held in place.

Because of the resiliently deformable character of each wing and its respective extension portion 54,54', it is possible for each such portion to be pulled out of engagement with the bracket upon extraordinary downward force away from the bracket causing deforming of the extension portion 54,54' sufficient to pull the same from the respective pin. In this way, there is provided the capability of the wing being disengaged in the event of an accident, emergency, or other hazardous situation which might force the wing against the front tire which it covers, and any substantial contact with the rotating tire by the wing would result in disengagement of the wing either by being externally contacted or by the force of the wheel tread upon the reinforcing ribs 53 or 53'. Such disengagement of the wing will thus prevent it from interfering with normal steering.

In operation, air impinging upon the apparatus, which may be at several times atmospheric pressure at highway speeds, strikes the front face 26 of door 24 and faces 52,52' of wings 29,29', being thus deflected upwardly and to the sides so as to pass around cab 13 and blocked from passing through the protected frontal clearance area. The small spacing between the lower edge 28 and ground level is neglectably small. Should a small obstruction, such as a rock, piece of debris, etc. be present upon the ground or highway surface 21 which would exceed the clearance beneath edge 28, the same will strike the flexible skirt 50, and thus pass therebeneath without substantially disturbing or rocking door 24 and protecting against abrasion and wear. Should a substantially larger object be struck, door 24 will be caused to rock about its pivot axis upon the torsion bar connecting provided by fitmets 48,48', thus rotating safely to allow the obstruction to be passed without damage. The torsion bars then resiliently urge the door back to its air blocking position. The balancing of aerodynamic forces above and below the pivot axis prevent disturbance of the air dam during normal operation, yet a relatively small force caused by even a lightweight obstruction, such as a cardboard box upon the pavement, will rock the door quickly about its axis for protection against damage or interference by the obstruction.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed and desired to be secured by Letters Patent is:

1. Air dam apparatus for a motor vehicle having a frontal clearance area defined by space beneath said vehicle extending to ground level, said apparatus comprising a door-like air deflection panel member dimensioned for substantially blocking said frontal area by deflection of air therefrom upon forward movement of said vehicle, strut means adapted for being attached to said vehicle for extending below said vehicle at the front thereof, pivot means hingedly securing said panel member to said strut means with said panel extending transversely across said frontal clearance area and for permitting the lower edge of said panel to be closely proximate ground level, said pivot means defining a transverse pivot axis about which said panel may rock, said pivot axis being vertically positioned with respect to said panel for providing substantial balancing of aerodynamic forces upon said panel above and below said pivot axis during forward movement of said vehicle, means resiliently urging said panel with respect to said pivot axis toward a position for blocking said frontal area but permitting rocking about said pivot axis in response to an obstruction contacting said panel below said pivot axis, said pivot axis being positioned relative to the body of said panel member so as to provide an upper portion of said panel member above said pivot axis and a lower portion of said panel member below said pivot axis, and upper portion advancing forward of said pivot axis and said lower portion retreating behind said pivot axis upon rocking of said panel member in response to said panel member being contacted by an obstacle, first and second wing members for deflecting air outwardly on opposite sides of said vehicle, and wing securement means adapted for being attached to said vehicle for mounting said wing panels on respective opposite sides of said panel member, said wing members each comprising an auxiliary panel positioned in front of a respective one of said wheels and extending from said vehicle to closely proximate ground level, said panel member and auxiliary panels together presenting, when said panel is in said blocking position, a substantially continuous air dam surface across the front of said vehicle therebelow, said wing members each being detachably interengaged with said vehicle for being pulled out of engagement upon extraordinary force downwardly away from said vehicle.

2. Air dam apparatus for a motor vehicle for substantially preventing air from passing beneath a vehicle, said apparatus comprising a door-like air deflection panel member for deflecting air from a frontal clearance area of said vehicle, securement means adapted for being attached to said vehicle for extending below said vehicle at the front thereof, means for pivotally attaching said panel member to said securement means with said panel member extending transversely across and below the front of said vehicle to permit rocking of said panel member about a transverse pivot axis for exposure of said panel member to aerodynamic forces substantially balanced above and below said pivot axis, and means for resiliently urging said panel member toward an air blocking position about said pivot axis, said panel member having a transversely extending lower edge closely adjacent ground level when said panel member is in said air blocking position, said panel member positioned centrally at the front of said vehicle for deflecting air which otherwise would pass between said wheels beneath said vehicle, said panel member being rockable from said air blocking position about said pivot axis in response to an obstruction contacting said panel member below said pivot axis, said pivot axis being positioned relative to the body of said panel member so as to provide an upper portion of said panel member above said pivot axis and a lower portion of said panel member below said pivot axis, said upper portion advancing forward of said pivot axis and said lower portion retreating behind said pivot axis upon rocking of said panel member in response to said panel member being contacted by an obstacle.

3. Air dam apparatus according to claim 2, said panel member comprising a principal panel member of substantially rigid character including a bottom edge spaced above ground level, and a skirt member secured to said panel member along said bottom edge thereof, said skirt member being of flexible, resilient character and defining said lower edge of said panel member, said vehicle having a bumper having a transversely extending lower edge, said principal panel member having a transversely extending upper edge proximate the lower edge of said bumper, whereby said panel member extends substantially from said bumper to closely adjacent ground level.

4. Air dam apparatus according to claim 2, said securement means comprising a pair of oppositely disposed struts, said struts each having an upper end for securement to structure of said vehicle and a lower end for pivotal securement of said panel member, said panel member having opposite side edges which extend substantially vertically when said panel member is in said air blocking position, the lower ends of said struts being presented at the respective opposite side edges.

5. Air dam apparatus according to claim 2, said means for resiliently urging said panel member toward an air blocking position comprising at least one elongated torsional member extending transversely along said panel member and defining said pivot axis, one end of said torsional member being secured to said panel member such that rocking of said panel member about said pivot causes torsion of said one end, said means for pivotally attaching said panel member comprising means interengaging said securement means and the other end of said torsional member for resisting rotation of said one end upon torsion of the first-said end.

6. Air dam apparatus according to claim 5, said means for resiliently urging said panel member toward an air blocking position comprising first and second torsion bars each having a transverse position lying transversely along a surface of said panel member and rotatingly secured thereto, the transverse portions of said torsion bars being aligned and together defining said pivot axis, each said torsion bar having a further portion forming an angle with the respective transverse portion and lying along a surface of said panel member, each said further portion having an end secured to said panel member such that rocking of said panel member about said pivot axis causes torsion of the respective transverse portion, each said transverse portion extending toward side edges of said panel member to provide a remote end of the respective torsion bar, said means for pivotally attaching said panel member comprising a pair of fitments, each said fitment interengaging said securement means and the respective remote end upon said torsion.

7. Air dam apparatus according to claim 6, said panel member of substantially rigid character, said panel member having recesses in a face thereof, said first and second torsion bars lying in said recesses.

8. Air dam apparatus according to claim 7, said securement means comprising a pair of oppositely disposed struts each having an upper end for securement to structure of said vehicle and a lower end, each said lower end carrying a respective one of said fitments, said panel member having also recesses for receiving at least said fitments, each said torsion bar remote end presenting a slot, said fitments each extending into a corresponding one of said slots.

9. Air dam apparatus according to claim 2 and further comprising first and second wing members for deflecting air outwardly on opposite sides of said vehicle, and wing securement means for attaching said wing members to said vehicle at opposite sides of said panel member.

10. Air dam apparatus according to claim 9, said panel member comprising a principal panel of substantially rigid character and substantially rectangular configuration, said wing members each comprising an auxiliary panel of substantially rigid character and generally rectangular configuration, said auxiliary panels presenting with said principal panel, when said panel member is in said air blocking position, a substantially continuous air dam surface across the front of said vehicle extending below said vehicle to closely adjacent ground level.

11. Air dam apparatus according to claim 10, said wing securement means comprising a pair of brackets, each said bracket being adapted for providing detachable interengagement between a corresponding one of said wing members and said vehicle to permit each said wing member to be pulled downwardly away from said vehicle and out of engagement therewith.

12. Air dam apparatus according to claim 11, each said wing member including an extension adapted for attachment to said vehicle by engagement caused by said extension being of resiliently deformable character and configured for being pulled out of said engagement for detachment from said vehicle upon extraordinary force downwardly away from said vehicle.

* * * * *